Patented July 20, 1937

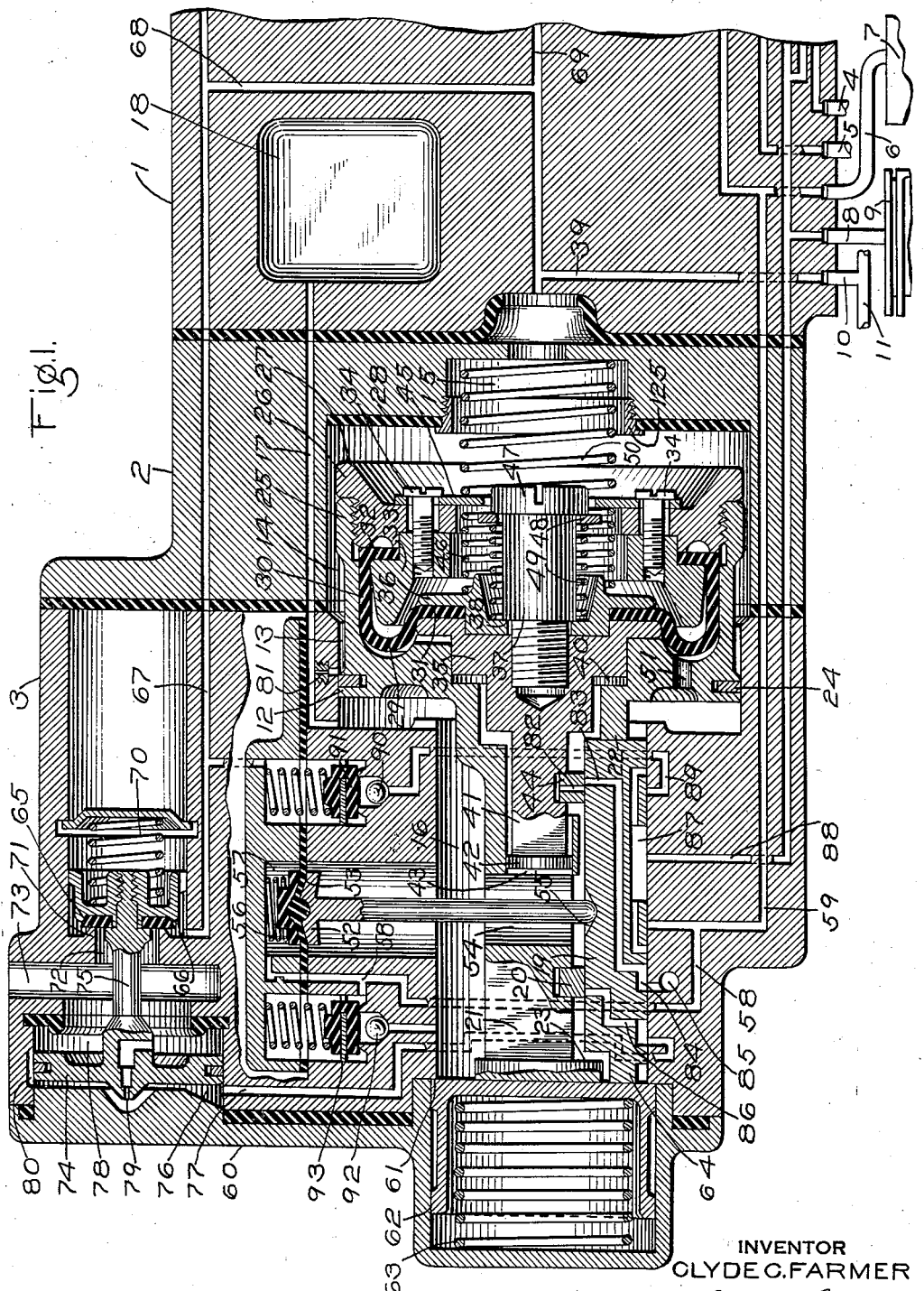

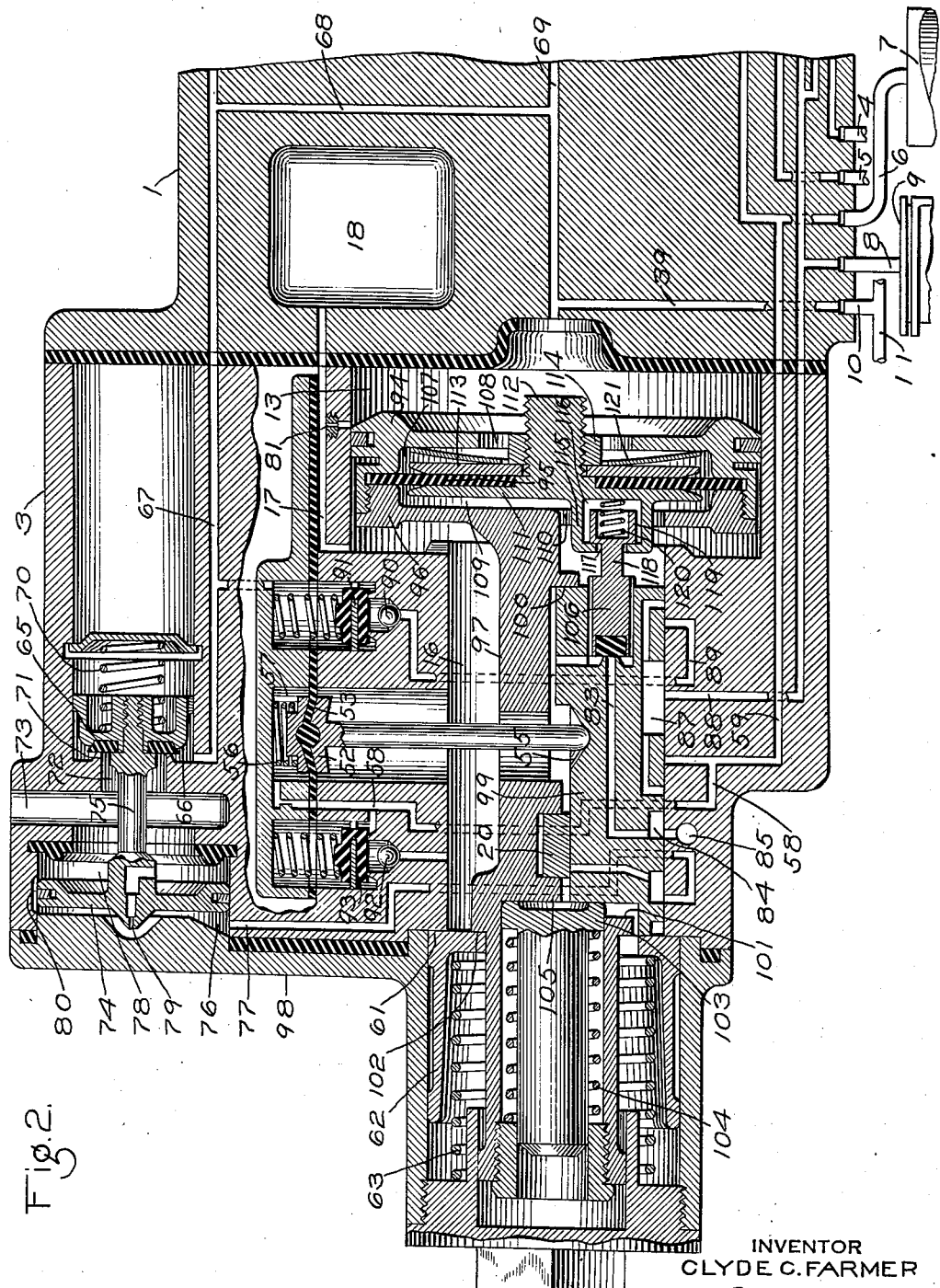

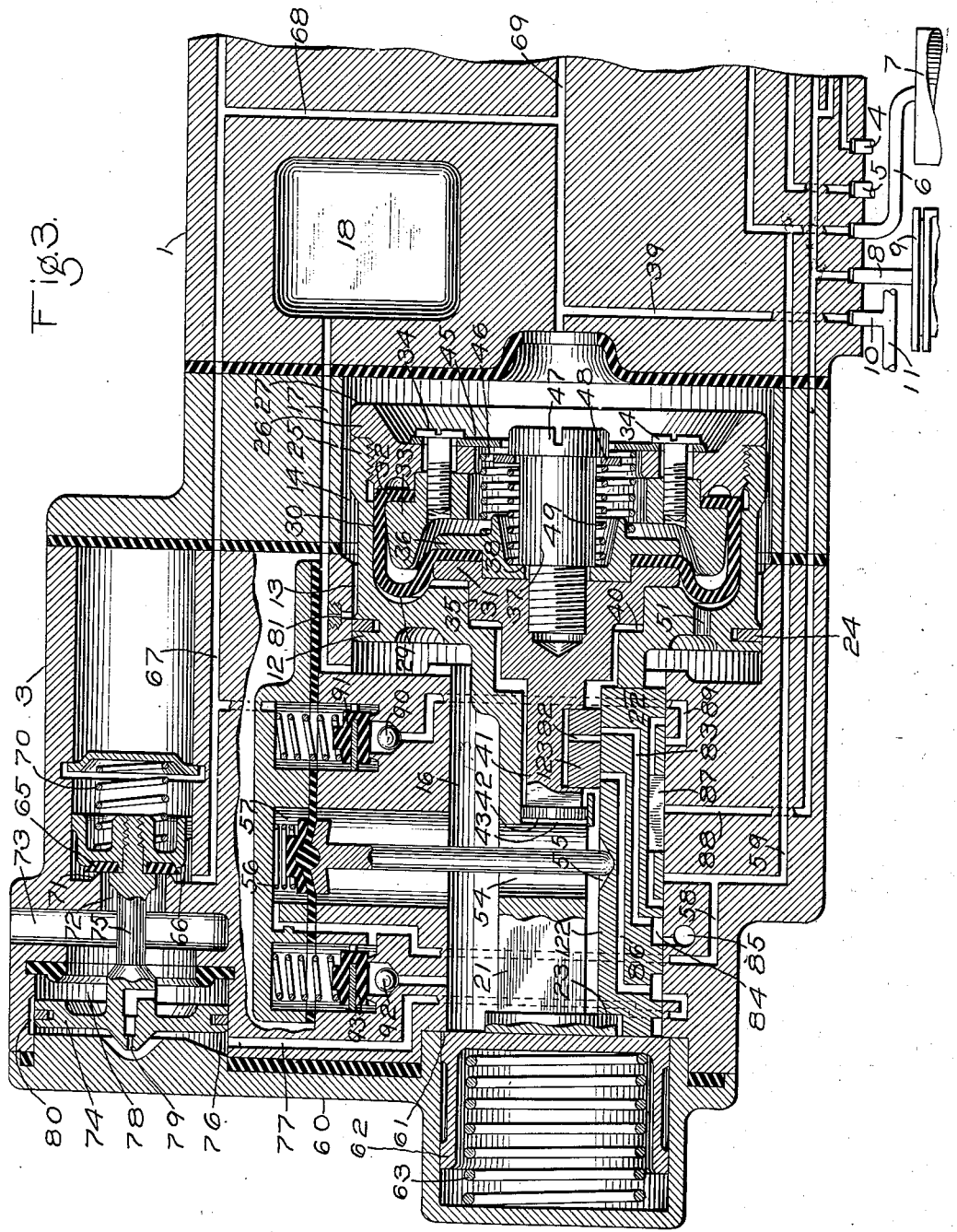

2,087,625

UNITED STATES PATENT OFFICE 2,087,625

FLUID PRESSURE BRAKE

Clyde C. Farmer, Pittsburgh, Pa., assignor to The Westinghouse Air Brake Company, Wilmerding, Pa., a corporation of Pennsylvania Application May 6, 1936, Serial No. 78,080

19 Claims. (Cl. 303—42)

This invention relates to fluid pressure brakes and more particularly to the type adapted to operate upon a reduction in brake pipe pressure to effect an application of the brakes and upon an increase in brake pipe pressure to effect a release of the brakes.

In Patent No. 2,031,213 issued to Clyde C. Farmer on February 18, 1936 there is disclosed a brake controlling valve device which includes a service portion adapted to operate upon a service reduction in brake pipe pressure to effect a service application of the brakes, and an emergency portion adapted to operate along with the service portion upon an emergency reduction in brake pipe pressure to effect an emergency application of the brakes.

The emergency portion comprises a piston subject to the opposing pressures of the brake pipe and a chamber and adapted to operate upon a service reduction in brake pipe pressure to move an auxiliary slide valve relative to a main slide valve to a service position in which fluid under pressure is vented from the quick action chamber at the same rate as the brake pipe pressure is reduced so as to thereby prevent further movement of said piston and auxiliary slide valve upon a service reduction in brake pipe pressure.

The communication through which fluid under pressure is vented from the quick action chamber in service position of the auxiliary slide valve is so restricted however as to prevent the pressure in the quick action chamber reducing as fast as the brake pipe pressure reduces upon an emergency reduction, so that upon an emergency reduction in brake pipe pressure, a sufficient differential of pressures is obtained on the emergency piston to move said piston and the auxiliary slide valve past service position to an emergency position in which fluid under pressure is vented from the quick action chamber to a brake pipe vent valve device. The brake pipe vent valve device is thereby operated to effect a sudden venting of fluid under pressure from the brake pipe for propagating emergency action through a train and thereby effecting an emergency application of the brakes on the train.

The emergency piston and auxiliary slide valve are adapted to be moved to service position when, upon a reduction in brake pipe pressure, a small differential, such as .4 of a pound, is obtained on said piston. In this position a stabilizing spring comes into action which opposes movement of the piston and auxiliary slide valve to emergency position. The spring has a force equivalent to a small differential of fluid pressures, such as .5 of a pound, on the emergency piston, and therefore acts in conjunction with the venting of fluid under pressure from the quick action chamber in service position to prevent movement of the emergency piston and auxiliary slide valve past service position to emergency position upon a service reduction in brake pipe pressure. It will be noted that in order for the piston to move the auxiliary slide valve to emergency position, the differential of fluid pressures on the piston must be such as to overcome this spring, or equal to at least .9 of a pound.

It is possible that after an emergency valve device has been in use for some time, the resistance to movement of the parts, and particularly the piston, may become greater than normal, due for instance to accumulations of foreign matter, lack of lubrication, the use of an improper lubricant, or for other reasons, and consequently a differential of fluid pressures greater than the .4 of a pound above mentioned may be required to start the piston and auxiliary slide valve moving upon a reduction in brake pipe pressure. So long however as the resistance to movement of the emergency piston and auxiliary slide valve does not increase beyond a certain degree, the action of the stabilizing spring on the piston in conjunction with the venting of fluid under pressure from the quick action chamber will prevent a sufficient differential of fluid pressures being developed on the piston to move same and the auxiliary slide valve past service position.

It is possible however that the static resistance to movement of the emergency piston and auxiliary slide valve and particularly the piston, may become such as to require a differential of fluid pressures on the piston exceeding the .9 of a pound above mentioned to start said piston and the auxiliary slide valve moving. Then if the kinetic resistance to movement of these parts should happen to be sufficiently low, there is a possibility that the piston may move the auxiliary slide valve through service position so fast that insufficient reduction in pressure in the quick action chamber will be effected to reduce the differential on the piston to a degree which will not overcome the stabilizing spring. In such a case, the piston is liable to move the auxiliary slide valve to emergency position upon a service reduction in brake pipe pressure and thereby initiate an emergency application of the brakes on a train.

It is undesirable to have an emergency application of the brakes occur upon a service reduction in brake pipe pressure and the principal object of the invention is to provide an improved emergency valve device having means for ensuring that an emergency application of the brakes will not occur upon a service reduction in brake pipe pressure.

This object is attained by providing in the emergency piston a flexible diaphragm which is responsive to a service reduction in brake pipe pressure to move an auxiliary slide valve on the main slide valve to a position for venting fluid under pressure from the quick action chamber at a service rate. The operation of a flexible diaphragm is not materially influenced by foreign matter or lubrication, as is a piston having sliding contact with a cylinder wall, so that the diaphragm can therefore be depended upon to operate an auxiliary slide valve as desired upon a service reduction in brake pipe pressure. An advantage of this improved construction is that it may be incorporated in the emergency valve device disclosed in the aforementioned patent by the mere substitution and/or addition of new parts, as will be hereinafter more fully described.

Other objects and advantages will be apparent from the following more detailed description of the invention.

In the accompanying drawings; Fig. 1 is a diagrammatic view, mainly in section, of a portion of a fluid pressure brake equipment embodying one form of the invention; Fig. 2 is a view similar to Fig. 1 of a brake controlling valve device embodying a modified form of the invention; and Fig. 3 is a view similar to Fig. 1 embodying still another form of the invention.

The portion of the fluid pressure brake equipment shown in Figs. 1, 2, and 3, of the drawings is in general similar to the emergency portion of the brake equipment disclosed in the aforementioned patent, only those parts being shown however which are deemed necessary to a clear understanding of the invention.

The portion of the fluid pressure brake equipment shown in Fig. 1 of the drawings comprises a pipe bracket 1 upon one face of which is mounted a filler piece 2 which carries an emergency valve device 3. The pipe bracket 1 has another face (not shown) upon which is adapted to be mounted a service valve device (not shown), and the bracket 1 is adapted to be connected by a pipe 4 to an auxiliary reservoir (not shown), by a pipe 5 to the usual pressure retaining valve device (not shown), by a pipe 6 to an emergency reservoir 7, by a pipe 8 to a brake cylinder 9 and by a pipe 10 to a brake pipe 11, in the same manner as disclosed in the aforementioned patent.

The emergency valve device comprises a casing having a bore containing an emergency piston 12 which has at one side a chamber 13 open to a concentric bore 14 formed in the filler piece 2 and communicating with the brake pipe 11 through a chamber 15, passages 69 and 39 and pipe 10.

The emergency piston 12 has at the opposite side a valve chamber 16 connected through a passage 17 to a quick action chamber 18. A main slide valve 19 and an auxiliary slide valve 20 mounted to slide on the main slide valve are disposed in chamber 16. A stem 21 projects from the piston 12 into chamber 16 and is provided with a cavity in which the auxiliary slide valve 20 is disposed so as to be moved with the piston 12. The main slide valve 19 is loosely disposed between a shoulder 22 formed on the back of piston 12 and a shoulder 23 formed on the end of the stem 21.

The piston 12 is provided with a packing ring 24 adapted to work in the bore in the emergency valve casing and has a hollow cup shaped extension 25 which projects into the bore 15.

A ring shaped cap 26 is secured in the outer end of the piston extension 25 preferably by screw-threaded engagement and is provided on its outer face with an annular bead 27 adapted to engage and seal against a gasket 28 secured to the end wall of bore 14 by means of a flanged nut 125 having screw-threaded engagement with the filler piece 2.

A flexible diaphragm 29 is disposed within the piston extension 25 and has a cylindrical portion 30 which is adapted to bear against an inner cylindrical surface of said extension. The diaphragm 29 has an inner, centrally perforated, flat ring portion 31 which is joined to one end of the cylindrical portion by means of an annular convolution which is substantially semicircular in cross-section. The other end of the cylindrical portion 30 of the diaphragm 29 is joined to an inwardly directed annular flange 32 which is clamped to the cap 26 between the inner surface thereof and a surface on a follower ring 33 which is secured to the cap 26 by a plurality of cap screws 34. It is desired to point out that by directing the clamping flange 32 of the diaphragm 29 inwardly, the maximum area of diaphragm is obtained within a space the diameter of which is substantially no greater than that of the piston 12, and this is very desirable in that it provides a diaphragm of sufficient size to be sensitive to slight fluctuations in fluid pressure for a purpose which will be hereinafter described.

The flat ring portion 31 of the diaphragm 29 is clamped between a follower 35 and a follower 36 by means of a stud 37 which is secured to the follower 35 by screw-threaded engagement and extends through a central aperture in the follower 36 and is provided with a shoulder 38 engaging the follower 36.

The follower 35 is slidably mounted in a suitable bore 40 in the piston 12 and is provided with a stem 41 which extends through a suitable cavity formed in the piston stem 21. A guide 42 is provided on the end of the stem 41 and is slidably mounted in a bore 43 in the piston stem 21. An auxiliary slide valve 44 is mounted to slide on the main slide valve 19 and is disposed between spaced shoulders on the stem 41 so as to be movable with said stem.

A spring stop in the form of a plate 45 is secured to the outer face of the cap 26 by the screws 34 and interposed between said plate and the diaphragm follower 36 is a service spring 46. This plate is provided with a central aperture through which the head 47 of the stud 37 is adapted to freely move. A spring stop 48 is slidably mounted on the stud 37 beneath the head 47 and an emergency spring 49 is interposed between the spring stop 48 and the follower 36 and acts to urge said spring stop into engagement with the head 47 of the stud 37. The outside diameter of the spring stop 48 is greater than the diameter of the aperture in plate 45 through which the stud head 47 operates so that said spring stop will engage said plate after a certain amount of movement of the diaphragm 29 towards the right hand.

A stabilizing spring 50 is interposed between spring stop 45 and the bottom wall of chamber 15 in the filler piece 2 and acts at all times to urge the piston 12 in a direction towards the left hand.

It will be noted from the above description that the right hand face of the flexible diaphragm 29 is subject to brake pipe pressure through the aperture in the spring stop 45, while the left hand face of said diaphragm is subject to quick action chamber pressure in valve chamber 16 through a port 51 in the piston 12.

A stem having a head 52 on one end engaging one face of a flexible diaphragm 53 extends through a suitable opening 54 in the piston stem 21 and engages the main slide valve 19 within a recess 55. A spring 56 and the pressure of fluid in a chamber 57 at the opposite side of the diaphragm 53 is adapted to apply pressure to the head 52 of the stem and thereby to the main slide valve to urge same against its seat. The chamber 57 is in constant communication with the emergency reservoir 7 through passages 58 and 59 and pipe 6.

The left hand end of the emergency valve chamber 16 is closed by a cap 60 which is provided with a bore larger in diameter but concentric to the bore of said chamber thereby forming on the emergency valve casing an annular shoulder 61. A plunger 62 is slidably mounted in the bore in cap 60 and is urged into engagement with the shoulder 61 by means of a spring 63.

With the parts of the apparatus in their normal position as shown in Fig. 1 of the drawings, the piston stem 21 and a rearwardly extending finger 64 on the slide valve 19 engage the plunger 62 which thereby acts to define said normal position. In this connection it is desired to point out that the pressure of spring 63 exceeds that of the stabilizing spring 56 so that the plunger 62 can be maintained against the shoulder 61 by spring 63 for the purpose just described.

Associated with the emergency valve device is a brake pipe vent valve device which comprises a vent valve 65 contained in a chamber 66 in constant communication with the brake pipe 11 through passages 67, 68, 69, and 39 and pipe 10. A spring 70 is disposed in chamber 66 and acts to urge the vent valve 65 into engagement with a seat rib 71 for closing communication from chamber 66 to a chamber 72 which is open to the atmosphere through an atmospheric passage 73.

A piston 74 is provided for unseating the vent valve 65 and is operatively connected thereto through the medium of a stem 75. This piston has at one side a chamber 76 connected to a passage 77 leading to the seat of the main slide valve 19 and has at the opposite side a chamber 78 open to the atmosphere through the passage 73.

A restricted blow down timing port 79 is provided through the piston 74 connecting chambers 76 to 78, while a by-pass leakage groove 80 is provided in the casing connecting the chambers at the opposite sides of said piston when said piston is in its normal position.

In operation, the service application portion (not shown) of the brake equipment operates in initially charging the brake equipment, in effecting service and emergency applications of the brakes and in releasing the brakes after an application in the same manner as described in the aforementioned patent, and in view of the fact that such operation is not pertinent to the invention the following description of operation will be limited to the operation of the emergency valve device which embodies the invention.

In initially charging the brake equipment fluid under pressure is supplied to the brake pipe 11 in the usual well known manner and from thence flows through pipe 10 and passage 39 to passage 69 in the pipe bracket 1. Fluid under pressure thus supplied to passage 69 flows in a direction toward the right hand to the service application portion (not shown) of the brake equipment, and in the opposite direction to chamber 15 in the filler piece 2 and from thence through bore 14 to chamber 13 at the right hand side of the emergency piston 12.

With the parts of the emergency valve device 3 in their normal position, as shown in the drawings, fluid under pressure flows from chamber 13 through a restricted charging port 81 to passage 17 and from thence in a direction toward the right hand to the quick action chamber 18 and in the opposite direction to the emergency valve chamber 16 thus charging said chambers with fluid at the pressure carried in the brake pipe 11.

With the main slide valve 19 in its normal position passage 77 is lapped and consequently the vent valve piston chamber 76 is at atmospheric pressure due to being vented through port 79 and groove 80. Spring 70 therefore acts to hold the vent valve 75 seated against the seat rib 71, and chamber 66 becomes charged with fluid under pressure supplied from the brake pipe 11 to passage 69 by way of said passage and passages 68 and 67.

When a service rate of reduction in brake pipe pressure is effected the pressure of fluid in chamber 15, bore 14 and chamber 13 at the right hand face of the emergency piston 12 and flexible diaphragm 29 reduces accordingly, and fluid under pressure then tends to flow back from the valve chamber 16 and quick action chamber 18 through the charging port 81. This port is however so restricted that a differential of pressures is developed on the piston 12 and diaphragm 29 and when this differential on said diaphragm becomes sufficient it overcomes the opposing pressure of the service spring 46 and deflects said diaphragm towards the right hand.

This movement of the diaphragm 29 pulls the auxiliary slide valve 44 towards the right hand until a port 82 therein registers with a port 83 in the main slide valve 19. Through the communication thus established fluid under pressure is permitted to flow from the valve chamber 16 and quick action chamber 18 to a cavity 84 in the seating face of the main slide valve and from thence to the atmosphere through an atmospheric passage 85, thereby reducing the pressure in said chambers at the same rate as the brake pipe pressure reduces upon a service rate of reduction. This prevents the differential of pressures acting on the diaphragm 29 from increasing sufficiently to keep said diaphragm moving so as to move the auxiliary slide valve past the position just described upon a service reduction in brake pipe pressure.

At about the time the port 82 in the auxiliary slide valve 44 registers with the port 83 in the main slide valve, the spring stop 48 engages the spring stop 45, so that further deflection of the diaphragm 29 towards the right hand is opposed by the spring 49 in addition to the spring 46. The engagement between the spring stops 48 and 45 thus defines the service position of the flexible diaphragm 29 and auxiliary slide valve 44 and acts in conjunction with the reducing of pressure in valve chamber 16 through the service ports 82 and 83 to prevent sufficient differential of fluid pressures being developed on the diaphragm to cause said diaphragm and the auxiliary slide valve 14 to move past the service position upon a service reduction in brake pipe pressure.

The purpose of spring 46 is to define the differential of fluid pressures required on the diaphragm 29 to move the auxiliary slide valve 44 to service position and thereby prevents such movement upon a less differential which may be encountered in service due to slight fluctuations in brake pipe pressure which may be caused by operation of the usual feed valve device (not shown).

The spring 50 acts with such force on the piston 12 as to ensure that said piston will not be moved from its normal position by the differential of pressures required to deflect the diaphragm 29 and move the auxiliary slide valve 44 to their service position, as might occur if for any reason the resistance to movement of the piston 12 and auxiliary slide valve 20 should become lower than that of the diaphragm 29 and slide valve 44.

When upon a service reduction in brake pipe pressure, the pressure in valve chamber 16 and quick action chamber 18 has been reduced as above described to substantially equal the brake pipe pressure in bore 14, the spring 46 deflects the diaphragm towards the left hand and causes the slide valve 44 to lap port 83 so as to cut off further venting of fluid under pressure from the valve chamber 16 and quick action chamber 18.

Further service reductions in brake pipe pressure cause the above operation of diaphragm 29 and the auxiliary slide valve 44 to be repeated, so that the emergency piston 12 is prevented from moving from its normal position so long as the reductions in brake pipe pressure are at a service rate.

When a sudden reduction in brake pipe pressure is effected at an emergency rate, the diaphragm 29 operates as above described to move the slide valve 44 to service position in which fluid under pressure tends to be vented from the valve chamber 16 and quick action chamber through the service ports 82 and 83, but this communication is so restricted with respect to an emergency rate of reduction in brake pipe pressure, that the differential of pressures on the diaphragm promptly increases sufficiently to overcome the pressure of the emergency spring 49. The diaphragm then moves further to the right into engagement with the follower ring 33 and in so doing moves the auxiliary slide valve past service position to an overtravel position in which the service port 83 is lapped by the slide valve 44.

At about the time the slide valve 44 laps the service port 83, sufficient differential of fluid pressures is obtained on the emergency piston 12 to overcome the static resistance to movement of said piston and the auxiliary slide valve 20 and the resistance of the stabilizing spring 50, whereupon said piston moves said valve towards the right hand until the shoulder 23 engages the end of the main slide valve 19. In this position of the auxiliary slide valve 20, an emergency port 86 is opened to valve chamber 16 which permits fluid under pressure to flow from said chamber and the quick action chamber 18 to passage 77 and from thence to the vent valve piston chamber 76.

The rate at which fluid under pressure is thus supplied to the vent valve piston chamber 76 exceeds the venting capacity of port 79 and groove 80, so that sufficient pressure is promptly obtained on the vent valve piston 74 to actuate same to unseat the vent valve 65.

When the vent valve is unseated, fluid under pressure is suddenly vented from the brake pipe 11 by way of pipe 10, passages 39, 69, 68, 67, past the vent valve 65 and from thence to the atmosphere through passage 73. This sudden venting of fluid under pressure from the brake pipe is adapted to propagate emergency action throughout a train in the well known manner and also increases the differential of fluid pressures on the emergency piston 12 to a degree sufficient to move the main slide valve 19 to a position defined by the engagement of the sealing bead 27 with the gasket 28.

In this position of the main slide valve 19, a cavity 87 therein connects the emergency reservoir passage 59 to a passage 88 leading to the brake cylinder 9 which permits fluid under pressure to equalize from said reservoir into said brake cylinder to provide high emergency brake cylinder pressure. In this position of the main slide valve, the passage 77 is uncovered by the left hand end thereof so that fluid under pressure from the valve chamber 16 and quick action chamber 18 continues to be supplied to the vent valve piston chamber 76.

The pressure of fluid thus supplied to the vent valve piston chamber 76 gradually reduces through the vent port 79 which is of such size with respect to the combined volumes of valve chamber 16 and quick action chamber 18 as to cause the vent valve piston 74 to hold the vent valve 65 in the venting position sufficiently long to ensure substantially complete venting of fluid under pressure from the brake pipe, following which the spring 70 acts to seat the vent valve 65 and return the piston 74 to its normal position so that the brake equipment may be recharged and the brakes released, whenever it is desired to do so.

When the quick action chamber pressure in valve chamber 16 is reduced sufficiently in the manner above described, the springs 46 and 49 return the diaphragm 29 and auxiliary slide valve 44 to their normal position with respect to the piston 12, and the spring 50 moves said piston and the auxiliary slide valve 20 towards the left hand until the shoulder 22 on the back of the piston engages the end of the main slide valve 19. The piston 12 ceases movement in this position since the force of spring 50 is insufficient to move the slide valve 19 which is pressed against its seat by emergency reservoir pressure plus the pressure of spring 56 in chamber 57 acting downwardly on the diaphragm 53.

When it is desired to effect a release of the brakes after an emergency application, fluid under pressure is supplied to the brake pipe 11 and from thence flows to the emergency piston chamber 13 at the right hand side of the emergency piston 12. When the pressure is thus increased sufficiently on said piston to overcome resistance to movement of the main slide valve 19, said piston shifts said slide valve back to its normal position as shown in the drawings.

In the normal position of the emergency piston, the restricted feed port 81 is opened to chamber 13 so that fluid under pressure then flows from chamber 13 to the emergency valve chamber 16 and quick action chamber 18.

The size of the feed port 81 is such with respect to the rapid rate of increase in brake pipe pressure obtained at the start of charging of the brake pipe after an emergency application that the brake pipe pressure in chamber 13 increases more rapidly than the quick action chamber pressure and when thus increased sufficiently overcomes the opposing pressure of spring 63 acting on the movable stop 62 and moves the piston 12 and main slide valve 19 to a backdump position as defined by engagement of the left hand face of the piston with the emergency valve casing.

In back dump position of the main slide valve 19, cavity 87 therein connects the brake cylinder passage 86 to a passage 89 which permits fluid under pressure to flow from the brake cylinder 9 to passage 29 and from thence past two serially arranged check valves 90 and 91 to passage 67 and from thence to the brake pipe 11. The consequent equalization of fluid under pressure from the brake cylinder into the brake pipe provides a sudden local increase in brake pipe pressure which is adapted to cause the emergency valve device on the next car in a train to operate in like manner and thereby propagate this action serially from car to car throughout a train so as to hasten the increase in brake pipe pressure.

After this back-dump operation, fluid under pressure supplied to the brake pipe in the usual well known manner continues to increase the brake pipe pressure to the degree normally carried and at the same time fluid under pressure continues to flow from the emergency piston chamber 13 through the feed port 81 to the emergency valve chamber 16 and quick action chamber 18. When the pressure of fluid in these chambers is increased to substantially that in the brake pipe, the action of spring 63 on the stop 62 returns the emergency piston 12 and main slide valve 19 to their normal position as shown in the drawings.

If while recharging the brake equipment the emergency valve chamber 16 and quick action chamber 18 become charged to a pressure slightly in excess of that in the emergency reservoir 7, the pressure in said chambers will unseat the serially arranged check valves 92 and 93. Fluid under pressure will then flow from said chambers to passage 59 and from thence to the emergency reservoir 7 which is of large volume and thus able to prevent said chambers from becoming charged to a pressure in excess of that normally carried in the brake pipe.

From the above description it will now be noted that the service venting of fluid under pressure from the valve chamber 16 and quick action chamber 18 is controlled by the service auxiliary slide valve 44 and flexible diaphragm 29 and since the size of said valve is relatively small as compared to the area of said diaphragm, and the operation of the diaphragm is not materially affected by foreign matter or lubrication, it will be evident that the diaphragm will operate the valve 44 in the manner desired and at substantially the differential of pressures desired, as governed by spring 46 upon a service reduction in brake pipe pressure and by springs 46 and 49 upon an emergency reduction in brake pipe pressure. It will be further noted that the size of the service auxiliary slide valve 44 need only be large enough to control the one communication, that is, between ports 82 and 83, and its resistance to movement will not therefore materially affect the differential of pressures required to deflect the diaphragm.

The bias or stabilizing spring 50 ensures that the piston 12 and emergency auxiliary slide valve 20 will not operate upon a service reduction in brake pipe pressure, but an emergency reduction in brake pipe pressure will ensure the differential required on this piston to move the auxiliary slide valve 20 to provide for sudden venting of fluid under pressure from the brake pipe 11, while this sudden venting of fluid under pressure from the brake pipe will ensure operation of the main slide valve 19 by the piston 12. In this connection it should be noted that the emergency auxiliary slide valve 20 controls only one communication as is the case with the service auxiliary slide valve 44, and may therefore be relatively small as compared to the area of the piston 12, so that any changes in the static resistance to movement of this valve will not materially affect the differential of pressures required on said piston to move said piston and valve.

Upon an emergency reduction in brake pipe pressure the diaphragm 29 deflects into engagement with the follower ring 33 and thereby moves the slide valve 44 to an overtravel position in which the service port 83 is lapped, as above explained. This prevents the venting of fluid under pressure from the valve chamber 16 and quick action chamber 18 through the service port 83 while obtaining the differential of pressures required on piston 12 to move said piston and the auxiliary valve 20 to the position for effecting operation of the brake pipe vent valve device. However, the provision of this overtravel position necessitates the use of spring 49 and the movable stop 48 and greater deflection of the diaphragm 29.

If desired, this overtravel position of the auxiliary slide valve 44 may be dispensed with along with the spring 49 and spring stop 48, and the deflection of the flexible diaphragm could then be so limited that the service vent ports would be open while attaining the differential of pressures required on piston 12 to move said piston and the auxiliary slide valve 20 to the position for effecting the operation of the brake pipe vent valve device upon an emergency reduction in brake pipe pressure. Such a modified construction is shown in Fig. 2 of the drawings.

The fluid pressure brake equipment shown in Fig. 2 of the drawings comprises an emergency valve device the casing of which is substantially the same as that disclosed in Fig. 1 of the drawings. An emergency piston 94 is mounted in the casing and has the chamber 13 at one side open to the brake pipe 11 and the chamber 16 at the opposite side open to the quick action chamber 18.

A flexible diaphragm 95 is secured to said piston by means of a clamping ring 96 having screwthreaded engagement with the piston. The ring 96 carries one end of a stem 97, while the other end of said stem extends through a central aperture in the plunger 62 and is slidably mounted in a suitable bore in a cover 98 which is secured to the emergency valve device.

A main slide valve 99 is disposed in the valve chamber 16 between shoulders 100 and 101 on the piston stem 97. The emergency auxiliary slide valve 20 is mounted to slide on the main slide valve 99 and is disposed in a recess in the stem 97 for movement therewith.

The stem 97 is provided with a shoulder 102 adapted to engage the plunger 62 for defining the normal position of the piston 94 and valves 20 and 99. A movable plunger 103 is slidably mounted in the left hand end of the stem 97. A spring 104 in the stem 97 acts on the plunger 103 urging same against a shoulder 105 formed in said stem, in which position the right hand face of the plunger engages the end of the main slide valve 99 while a certain clearance exists between the shoulder 101 on said stem and the end of the main slide valve.

The main slide valve 99 is like that shown in Fig. 1 of the drawings except that the service port 83 is arranged to be controlled by a poppet valve 106 which is slidably mounted in a suitable bore in the right hand end of said slide valve and which is adapted to be operated by the flexible diaphragm 95.

The diaphragm 95 has at one side a chamber 107 open through a central aperture 108 in the piston 94 to the brake pipe chamber 13, and has at the opposite side a chamber 109 open to the emergency valve chamber 16 through an aperture 110 provided through the clamping ring 96 below the stem 97.

A follower plate 111 is disposed in chamber 109 against the diaphragm 95 and is provided with a stud 112 which extends through a suitable opening in said diaphragm into chamber 107. A follower plate 113 is disposed in chamber 107 against the diaphragm and has a central opening through which the stud 112 extends. A nut 114 is provided on the stud 112 to clamp the follower plates 111 and 113 to the diaphragm 95 so as to move with said diaphragm upon deflection thereof.

The follower 111 is provided with an outstanding lug 115 which projects through the aperture 110 in the clamping ring 96. This lug is provided with a chamber 116, and an opening 117 in axial alignment with the service auxiliary valve 106 connects said chamber to the emergency valve chamber 16.

The service auxiliary valve 106 is provided with a stem 118 which loosely extends through the opening 117 in the lug 115 and which is provided within chamber 116 with a head 119 of greater diameter than that of the opening 117. A spring 120 in chamber 116 acts on the head 119 urging same in a direction towards the left hand into engagement with the portion of lug 115 surrounding the opening 117.

A leaf spring 121 is provided in chamber 107 between the piston 94 and follower 113 and in this construction has the same function as the service spring 46 disclosed in Fig. 1 of the drawings.

In operation, the brake equipment is initially charged with fluid under pressure in the same manner as described in connection with the construction shown in Fig. 1 of the drawings.

When, upon a service reduction in brake pipe pressure, sufficient differential of fluid pressures is obtained on the diaphragm 95, said diaphragm deflects towards the right hand against the opposing pressure of spring 121. This movement of the diaphragm pulls the service auxiliary valve 106 from its seat to permit venting of fluid under pressure from the valve chamber 16 and quick action chamber 18 to the service port 83 and from thence to the atmosphere so as to prevent movement of the piston 94 and emergency auxiliary valve 20 upon a service reduction in brake pipe pressure in the same manner as accomplished by the diaphragm 29 and service auxiliary valve 44 in the construction shown in Fig. 1 of the drawings.

It will be noted that in the construction shown in Fig. 2 the action of spring 104 through plunger 103 on the end of the main slide valve 99 stabilizes the emergency piston 94 against undesired movement to emergency position upon a service reduction in brake pipe pressure as is accomplished by spring 50 in the construction shown in Fig. 1 of the drawings. This stabilization is however dependent upon the static resistance to movement of the main slide valve 99 being sufficiently greater than the pressure of spring 104 to ensure the proper operation, whereas in the construction previously described, the stabilizing action of spring 50 is independent of the main slide valve 19.

It will be evident that upon an emergency reduction in brake pipe pressure the service auxiliary valve 106 will operate to permit venting of fluid under pressure from the emergency valve chamber 16 and quick action chamber 18 the same as upon a service reduction in brake pipe pressure, so that the differential of fluid pressures required to move the piston 94 against the pressure of stabilizing spring 104 must be obtained while this service venting is taking place in contrast to the construction shown in Fig. 1 in which the service auxiliary valve 44 has an overtravel position to prevent service venting of fluid under pressure from the valve chamber 16 and quick action chamber 18 upon an emergency reduction in brake pipe pressure.

While the stabilizing spring 104 acts in the same capacity as the spring 50 in the construction shown in Fig. 1 to oppose operation of the emergency piston to move the emergency auxiliary valve 20 to the position for effecting operation of the brake pipe vent valve 65, it will be evident that movement of the main slide valve 99 to the position for supplying fluid under pressure to the brake cylinder 9 is not opposed by this spring in contrast to the action of spring 55 in the construction shown in Fig. 1.

The spring 120 is provided between the service valve 106 and diaphragm 111 to permit movement of said diaphragm towards the left hand relative to said valve so as to prevent the seating face of said valve being subjected to and thus possibly becoming damaged by the differential of pressures developed on the diaphragm upon an increase in brake pipe pressure and particularly where this increase is rapid and the differential developed is relatively high as may occur in back-dump operation of the device in effecting a release of the brakes after an emergency application.

In the embodiments of the invention shown in Figs. 1 and 2, the flexible diaphragm controls the service auxiliary valve for venting fluid under pressure from the emergency valve chamber 16 and quick action chamber 18 upon a service reduction in brake pipe pressure, while the supply of fluid under pressure to the vent valve device is controlled by an emergency auxiliary slide valve 20 which is operative by the emergency piston and therefore independent of the service auxiliary valve. While these constructions provide the smallest possible size of service auxiliary valve to be operated by a flexible diaphragm which in turn is limited in size to substantially the diameter of the emergency piston, it is however possible that the functions of both auxiliary valves may be combined in one auxiliary valve and be controlled by a flexible diaphragm associated with the emergency piston. Such a construction is disclosed in Fig. 3 of the drawings.

According to the construction shown in Fig. 3 of the drawings, an auxiliary slide valve 123 is provided on a main slide valve 122 to be operated by the diaphragm controlled stem 41. The main slide valve 122 is the same as that shown in Fig.

1 of the drawings except that the upper end of the emergency port 86 is relocated so as to be controlled by the auxiliary slide valve 123 which for this purpose is slightly larger than the auxiliary slide valve 44 shown in Fig. 1 of the drawings. Since the only function of piston 12 in the construction shown in Fig. 3 is to operate the main slide valve 122 there is no lost motion provided between the spaced shoulders 22 and 23 on the piston stem 21 and the main slide valve 122 as was the case in the construction shown in Fig. 1 where the piston 12 was required to move the auxiliary slide valve 20 relative to the main slide valve 19.

In operation, when a service reduction in brake pipe pressure is effected the flexible diaphragm 29 responds and moves the auxiliary slide valve 123 to service position defined by the engagement of spring stop 48 with stop 45. In this position the service ports 82 and 83 register to permit venting of fluid under pressure from the emergency valve chamber 16 and quick action chamber 18, as occurs in the construction shown in Fig. 1, but also in this position the auxiliary slide valve 121 laps the emergency port 86. When an emergency reduction in brake pipe pressure is effected, the flexible diaphragm 29 deflects until the follower 35 engages the ring 33 and thus moves the auxiliary slide valve 123 to the overtravel position in which the service port 83 is lapped, as in the construction shown in Fig. 1 of the drawings, but also in this overtravel position, the emergency port 86 is uncovered which permits fluid under pressure to flow from the valve chamber 16 and quick action chamber 18 to the vent valve piston chamber 76. The vent valve piston 74 is thereby operated to open the vent valve 65 to effect sudden venting of fluid under pressure from the brake pipe 11 and emergency piston chamber 13 whereupon the emergency piston 12 moves the main slide valve 122 to emergency position to supply fluid under pressure to the brake cylinder 9 as occurs in the construction shown in Fig. 1 of the drawings.

In effecting a release of the brakes after an application the equipment shown in Fig. 3 of the drawings operates in the same manner as that shown in Fig. 1.

It will be evident that since in the construction shown in Fig. 3 of the drawings, the emergency piston 12 does not have movement relative to the main slide valve 122, its travel is less in effecting an emergency application of the brakes than is the case in the equipment shown in Figs. 1 and 2 of the drawings, and this is desirable for various reasons such as from the standpoint of wear of the piston.

Due to the fact that the auxiliary slide valve 123 may be somewhat larger than the valve 44 shown in Fig. 1 and may therefore have a slightly greater resistance to movement, the force of springs 46 and 49 on the diaphragm may be somewhat less than in the construction shown in Fig. 1 in order that the flexible diaphragm 29 shown in Fig. 3 will operate upon substantially the same differentials of fluid pressures as required to operate the diaphragm 29 in the construction shown in Fig. 1.

It will now be noted that in accordance with the invention, a flexible diaphragm of substantially the same area as the emergency piston is provided for effecting operation of a relatively small valve to vent fluid under pressure from the quick action chamber upon a service reduction in brake pipe pressure, while according to the constructions shown in Figs. 1 and 2 of the drawings, a relatively small valve is provided to be actuated by the emergency piston upon an emergency reduction in brake pipe pressure to effect operation of the brake pipe vent valve. The functions of these two relatively small valves are contained in one auxiliary valve adapted to be actuated by a flexible diaphragm in the embodiment shown in Fig. 3 of the drawings. It will be evident that since the deflection of a flexible diaphragm is substantially independent of foreign matter, lubrication etc. which materially affects the operation of a piston, the diaphragm in the various embodiments will operate at substantially the time desired upon a reduction in brake pipe pressure.

The association of a flexible diaphragm with the emergency piston permits the application of the invention to emergency valves such as disclosed in the above mentioned patent with a minimum of change in said valves. It is desirable that this diaphragm will have as large an area as possible as restricted by the diameter of the emergency piston, and the construction shown in Figs. 1 and 3 of the drawings discloses the manner in which the large area is obtained.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means operative to vent fluid under pressure from said chamber at a service rate, and a flexible diaphragm carried by said piston and also subject to the opposing pressures of said brake pipe and quick action chamber and operative upon a service reduction in brake pipe pressure to effect the operation of said valve means.

2. In a fluid pressure brake, in combination, a brake pipe, a valve operative to effect an emergency operation, a piston subject to the opposing pressures of said brake pipe and a quick action chamber and operative upon a reduction in brake pipe pressure to effect the operation of said valve, a flexible diaphragm carried by said piston and also subject to the opposing pressures of said brake pipe and chamber, valve means operative by said diaphragm upon a service rate of reduction in brake pipe pressure to reduce the pressure of fluid in said chamber at a corresponding rate, and means cooperative with the service rate of venting of fluid under pressure from said chamber to prevent the operation of said piston upon a reduction in brake pipe pressure at a rate less than an emergency rate.

3. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, a flexible diaphragm carried by said piston and also subject to the opposing pressures of said brake pipe and chamber, valve means movable by said diaphragm to a service position upon a service rate of reduction in brake pipe pressure to vent fluid under pressure from said chamber at a corresponding rate, and means for preventing said operation of said valve means upon a reduction in brake pipe pressure at a rate less than a service rate.

4. In a fluid pressure brake, in combination, a brake pipe, a valve operative to effect an emergency operation, a piston subject to the opposing pressures of said brake pipe and a quick action chamber and operative to effect the operation of said valve, a flexible diaphragm carried by said piston and also subject to the opposing pressures of said brake pipe and chamber, valve means operative by said diaphragm upon a reduction in brake pipe pressure to vent fluid under pressure from said chamber, and means for limiting the rate at which fluid under pressure is vented from said chamber by the operation of said valve means to a degree whereby upon an emergency reduction in brake pipe pressure sufficient differential of pressures will be obtained on said piston to effect the operation of said valve.

5. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means movable to a service position for venting fluid under pressure from said chamber at a service rate to prevent operation of said piston upon a service rate of reduction in brake pipe pressure, a flexible diaphragm carried by said piston and also subject to the opposing pressures of said brake pipe and chamber and operative upon a service reduction in brake pipe pressure to move said valve means to said service position, and means for preventing operation of said diaphragm upon a reduction in brake pipe pressure at a rate less than a service rate.

6. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means movable to a service position for venting fluid under pressure from said chamber at a service rate to prevent operation of said piston upon a service rate of reduction in brake pipe pressure, and movable to another position for closing the venting communication which is opened in service position thereof, a flexible diaphragm carried by said piston and also subject to the opposing pressures of said brake pipe and chamber and operative upon a reduction in brake pipe pressure to move said valve to said positions, means for preventing operation of said diaphragm upon a reduction in brake pipe pressure at a rate less than a service rate, and means for defining the service position of said valve means and for preventing operation of said diaphragm to move said valve means to the other position upon a reduction in brake pipe pressure at a rate less than an emergency rate.

7. In a fluid pressure brake, in combination, a brake pipe, a main slide valve movable to a position for effecting an application of the brakes, an auxiliary slide valve carried by said main slide valve and movable relative to said main slide valve in the normal position thereof to a position for effecting sudden venting of fluid under pressure from said brake pipe, a piston subject to the opposing pressures of said brake pipe and chamber and operative upon an emergency rate of reduction in brake pipe pressure to first move said auxiliary slide valve to the position for effecting venting of fluid under pressure from said brake pipe and then move said main slide valve to the position for effecting an application of the brakes, another auxiliary slide valve mounted on said main slide valve and movable relatively thereto to a service position for venting fluid under pressure from said quick action chamber at a service rate, a flexible diaphragm carried by said piston and also subject to the opposing pressures of said brake pipe and quick action chamber and operative upon a service rate of reduction in brake pipe pressure to effect the movement of said other auxiliary slide valve to service position, and means for preventing operation of said diaphragm upon a reduction in brake pipe pressure at a rate less than a service rate.

8. In a fluid pressure brake, in combination, a brake pipe, a main slide valve movable to a position for effecting an application of the brakes, an auxiliary slide valve carried by said main slide valve and movable relative to said main slide valve in the normal position thereof to a position for effecting sudden venting of fluid under pressure from said brake pipe, a piston subject to the opposing pressures of said brake pipe and chamber and operative upon an emergency rate of reduction in brake pipe pressure to first move said auxiliary slide valve to the position for effecting venting of fluid under pressure from said brake pipe and then move said main slide valve to the position for effecting an application of the brakes, another auxiliary slide valve mounted on said main slide valve and movable relatively thereto to a service position for venting fluid under pressure from said quick action chamber at a service rate, a flexible diaphragm carried by said piston and also subject to the opposing pressures of said brake pipe and quick action chamber and operative upon a service rate of reduction in brake pipe pressure to effect the movement of said other auxiliary slide valve to service position, means for preventing movement of said other auxiliary slide valve past service position by the operation of said diaphragm, and means for preventing operation of said diaphragm upon a reduction in brake pipe pressure at a rate less than a service rate.

9. In a fluid pressure brake, in combination, a brake pipe, a main slide valve movable to a position for effecting an application of the brakes, an auxiliary slide valve carried by said main slide valve and movable relative to said main slide valve in the normal position thereof to a position for effecting sudden venting of fluid under pressure from said brake pipe, a piston subject to the opposing pressures of said brake pipe and chamber and operative upon an emergency rate of reduction in brake pipe pressure to first move said auxiliary slide valve to the position for effecting venting of fluid under pressure from said brake pipe and then move said main slide valve to the position for effecting an application of the brakes, another auxiliary slide valve mounted on said main slide valve and movable relatively thereto to a service position for venting fluid under pressure from said quick action chamber at a service rate, and movable further to another position for closing the venting communication to said chamber, a flexible diaphragm carried by said piston and also subject to the opposing pressures of said brake pipe and chamber and operative upon a service reduction in brake pipe pressure to move said other auxiliary slide valve to service position and upon an emergency reduction in brake pipe pressure to move said other auxiliary slide valve to said other position, means for preventing operation of said diaphragm upon a reduction in brake pipe pressure at a rate less than a service rate, and means for defining the service position of said other auxiliary slide valve and also operative to prevent operation of said diaphragm to move said other auxiliary slide valve to its other position upon a reduction in brake pipe pressure at a rate less than an emergency rate.

10. In a fluid pressure brake, in combination, a brake pipe, a main slide valve movable to a position for effecting an application of the brakes, an auxiliary slide valve carried by said main slide valve and movable relative to said main slide valve in the normal position thereof to a position for effecting sudden venting of fluid under pressure from said brake pipe, a piston subject to the opposing pressures of said brake pipe and chamber and operative upon an emergency rate of reduction in brake pipe pressure to first move said auxiliary slide valve to the position for effecting venting of fluid under pressure from said brake pipe and then move said main slide valve to the position for effecting an application of the brakes, another auxiliary slide valve mounted on said main slide valve and movable relatively thereto to a service position for venting fluid under pressure from said quick action chamber at a service rate, a movable abutment also subject to the opposing pressures of said brake pipe and chamber and operative upon a reduction in brake pipe pressure to move said other auxiliary slide valve to said service position, and means for preventing operation of said movable abutment upon a reduction in brake pipe pressure at a rate less than a service rate.

11. In a fluid pressure brake, in combination, a brake pipe, a main slide valve movable to a position for effecting an application of the brakes, a piston subject to the opposing pressures of said brake pipe and a quick action chamber and operative upon a sudden reduction in brake pipe pressure to move said slide valve to said position, an auxiliary slide valve carried by said main slide valve and movable relatively thereto to a service position for venting fluid under pressure from said quick action chamber at a service rate and movable further to another position for effecting a sudden reduction in brake pipe pressure, a flexible diaphragm carried by said piston and also subject to the opposing pressures of said brake pipe and chamber and operative upon a service reduction in brake pipe pressure to move said auxiliary slide valve to said service position and upon an emergency reduction in brake pipe pressure to move said auxiliary slide valve to said other position, means for preventing operation of said diaphragm upon a reduction in brake pipe pressure at a rate less than a service rate, and means for preventing operation of said diaphragm to move said auxiliary valve to said other position upon a reduction in brake pipe pressure at a rate less than an emergency rate.

12. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means operative to reduce the pressure of fluid in said chamber at a service rate to prevent operation of said piston upon a service rate of reduction in brake pipe pressure, said piston including a flexible diaphragm of substantially the same diameter as said piston and also subject to the opposing pressures of said brake pipe and chamber and movable relatively to said piston upon a service reduction in brake pipe pressure to effect operation of said valve means.

13. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means operative to reduce the pressure of fluid in said chamber at a service rate to prevent operation of said piston upon a service rate of reduction in brake pipe pressure, said piston including a flexible diaphragm of substantially the same diameter as said piston and also subject to the opposing pressures of said brake pipe and chamber and movable relatively to said piston upon a service reduction in brake pipe pressure to effect operation of said valve means, and a spring carried by said piston and acting on said diaphragm to prevent deflection thereof upon a reduction in brake pipe pressure at a rate less than a service rate.

14. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means movable to a service position for reducing the pressure of fluid in said chamber at a service rate to prevent operation of said piston upon a service rate of reduction in brake pipe pressure, said valve means being movable through service position to another position, said piston including a flexible diaphragm of substantially the same diameter as said piston and also subject to the opposing pressures of said brake pipe and chamber and operative according to the rate of reduction in brake pipe pressure to move said valve means to either service position or said other position, a spring carried by said piston and acting on said diaphragm at all times to prevent operation thereof upon a reduction in brake pipe pressure at a rate less than a service rate, and another spring adapted to act on said diaphragm upon movement of said valve means to service position for defining said service position and for preventing operation of said diaphragm to move said valve means to said other position upon a reduction in brake pipe pressure at a rate less than an emergency rate.

15. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means operative to reduce the pressure in said chamber at a service rate to prevent operation of said piston upon a reduction in brake pipe pressure at a rate less than an emergency rate, said piston having an axial bore slightly smaller in diameter than said piston and open at one end, a flexible diaphragm having an outer cylindrical portion engaging the side wall of said bore and having at one end of said cylindrical portion an inwardly directed annular clamping flange, means clamping said flange to said piston, said diaphragm having a central annular clamping flange and an annular convolution joining the other end of said cylindrical portion to the outer edge of said central clamping flange, said piston having means for subjecting one face of said diaphragm to brake pipe pressure and the opposite face to the pressure of fluid in said chamber, and means secured to said central clamping flange and operatively connected to said valve means whereby deflection of said diaphragm upon a service rate of reduction in brake pipe pressure is operative to effect operation of said valve means.

16. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means operative to reduce the pressure in said chamber at a service rate to prevent operation of said piston upon a reduction in brake pipe pressure at a rate less than an emergency rate, said piston having an axial bore slightly smaller in diameter than said piston and open at one end, a flexible diaphragm having an outer cylindrical portion engaging the side wall of said bore and having at one end of said cylindrical portion an inwardly directed annular clamping flange, means clamping said flange to said piston, said diaphragm having a central annular clamping flange and an annular convolution joining the other end of said cylindrical portion to the outer edge of said central clamping flange, said piston having means for subjecting one face of said diaphragm to brake pipe pressure and the opposite face to the pressure of fluid in said chamber, means secured to said central clamping flange and operatively connected to said valve means for operating said valve means upon deflection of said diaphragm, a spring associated with said piston and acting on said diaphragm for preventing deflection thereof upon a reduction in brake pipe pressure at a rate less than a service rate, and another spring operative to define the position of said diaphragm and valve means in which the pressure of fluid in said chamber is reduced, said other spring being also adapted to prevent operation of said diaphragm to move said valve means past said position upon a reduction in brake pipe pressure at a rate less than an emergency rate.

17. In a fluid pressure brake, in combination, a brake pipe, a main slide valve operative to effect an application of the brakes, an auxiliary slide valve mounted on and movable relative to said main slide valve to effect a sudden venting of fluid under pressure from said brake pipe, a piston subject to the opposing pressures of said brake pipe and a quick action chamber, said piston having a stem connected to said main and auxiliary slide valves and operative upon an emergency reduction in brake pipe pressure to effect the operation first of said auxiliary slide valve and then of said main slide valve, another auxiliary slide valve mounted on and movable relative to said main slide valve to a service position for effecting a service rate of reduction in pressure in said chamber to prevent operation of said piston upon a service rate of reduction in brake pipe pressure, said piston including a flexible diaphragm also subject to the opposing pressures of said brake pipe and chamber, means supported at one end in said piston stem and connected at the other end to said diaphragm and operatively connected to said other auxiliary slide valve, said diaphragm being operative upon a service rate of reduction in brake pipe pressure to operate said means to move said other auxiliary slide valve to said service position, and means for preventing operation of said diaphragm upon a reduction in brake pipe pressure at a rate less than a service rate.

18. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means operative to vent fluid under pressure from said chamber at a service rate, a flexible diaphragm carried by said piston and also subject to the opposing pressures of said brake pipe and chamber and operative upon a service reduction in brake pipe pressure to effect the operation of said valve means, a yielding resistance means for preventing movement of said diaphragm to operate said valve means to vent fluid under pressure from the quick action chamber at a rate less than a service rate of reduction in brake pipe pressure, and a yielding resistance means for preventing movement of said emergency piston unless the brake pipe pressure is reduced at an emergency rate.

19. In a fluid pressure brake, in combination, a brake pipe, a valve operative to effect an emergency operation, a piston subject to the opposing pressures of said brake pipe and a quick action chamber and operative upon an emergency reduction in brake pipe pressure to effect the operation of said valve, valve means movable to a service position for establishing a communication for venting fluid under pressure from said chamber at a service rate and movable further to another position for closing said communication, a flexible diaphragm associated with said piston and also subject to the opposing pressures of said brake pipe and chamber and operative upon a service reduction in brake pipe pressure to move said valve means to said positions, yielding resistance means for preventing movement of said diaphragm to operate said valve means upon a reduction in brake pipe pressure at a rate less than a service rate, yielding resistance means for defining said service position and for preventing operation of said diaphragm to move said valve means to said other position upon a reduction in brake pipe pressure at a rate less than an emergency rate, and yielding resistance means for preventing movement of said piston upon a reduction in brake pipe pressure at a rate less than an emergency rate.

CLYDE C. FARMER.